C. E. SEAVEY.
Spice-Box Holders.
No. 150,718.     Fig. 1.     Patented May 12, 1874.
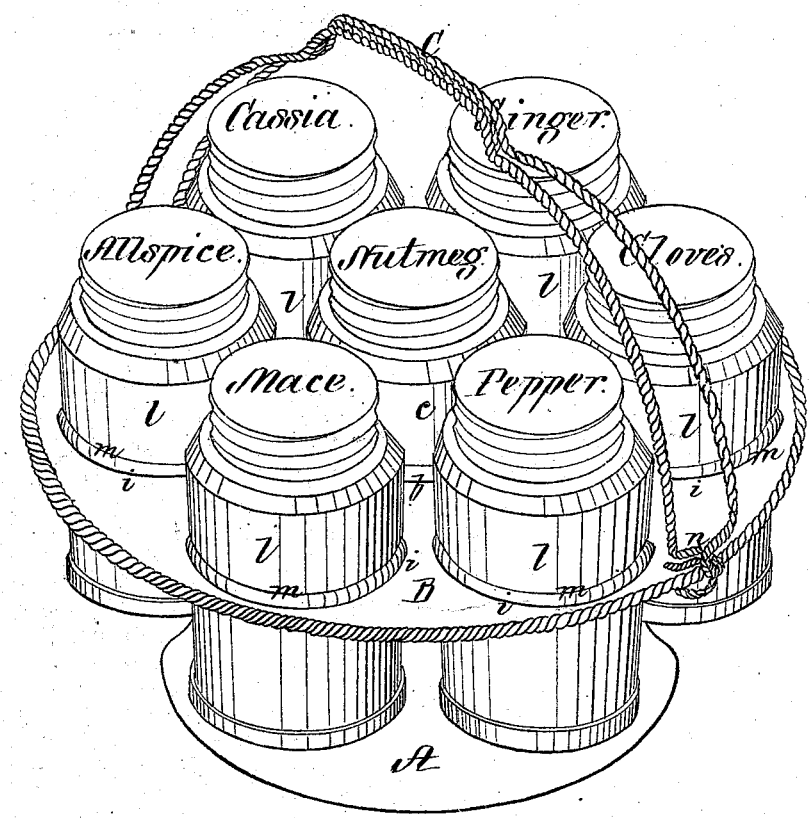
Fig. 2.
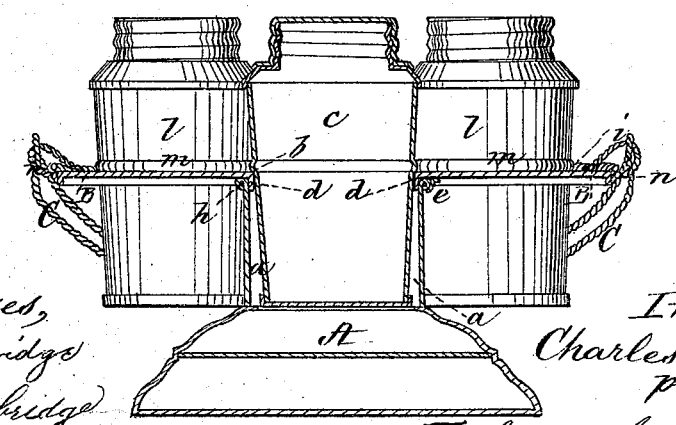
Witnesses,
W. J. Cambridge
J. E. Cambridge
Inventor,
Charles E. Seavey
pr
Teschemacher & Stearns
Attorneys.

UNITED STATES PATENT OFFICE.

CHARLES E. SEAVEY, OF BOSTON, MASSACHUSETTS.

IMPROVEMENT IN SPICE-BOX HOLDERS.

Specification forming part of Letters Patent No. 150,718, dated May 12, 1874; application filed April 21, 1874.

*To all whom it may concern:*

Be it known that I, CHARLES E. SEAVEY, of Boston, in the county of Suffolk and State of Massachusetts, have invented an Improved Spice-Box Holder, of which the following is a full, clear, and exact description, reference being had to the accompanying drawings making part of this specification, in which—

Figure 1 is a perspective view of a spice-box holder constructed in accordance with my invention. Fig. 2 is a vertical section through the center of the same.

It has been customary to place the several boxes containing spices of different kinds for culinary purposes, &c., within a receptacle provided with a lid or cover, which is objectionable, owing to the necessity of removing the cover and the inconvenience of taking out the several boxes. To obviate the above-mentioned objections is the purpose of my invention, which consists in a stand provided with a central socket for the reception of one of the spice-boxes, around which revolves a plate provided with openings, in which are placed other boxes for containing spices, &c., the plate, if desired, having a bail or handle, by which the holder can be easily carried from place to place.

To enable others skilled in the art to understand and use my invention, I will proceed to describe the manner in which I have carried it out.

In the said drawings, A is a circular base or stand, the upper portion of which terminates in a cylindrical socket, $a$, on top of which revolves a horizontal plate or support, B, provided with a central opening, $b$, to allow the central spice-box $c$ to be inserted within the socket. Extending down from the edge of the central opening in the plate or support B is a flange, $d$, which fits into the top of the socket, and, in connection with hooks $e$ on the under side of the plate, extending under a flange, $h$, formed on the outer edge of the top of the socket, serves to steady and hold the plate B in place. The plate B is provided with a series of openings, $i$, arranged radially around the center for holding a series of spice-boxes, $l$, and by revolving the plate around, any particular spice-box may be readily brought in front, ready for use. Each spice-box is provided with an enlargement, $m$, extending entirely around it, which rests upon the upper surface of the plate, and serves to support the box at the desired height. C is a bail or handle, the ends of which are pivoted to the plate B at points $n$, diametrically opposite, and by means of this handle the holder with its boxes may be conveniently carried from place to place. When the holder is not required for use the handle may be swung down, so as to allow of its being set away in a small space.

By means of my invention I am enabled to dispense with the ordinary covered receptacle heretofore used for containing the several spice-boxes, and avoid the inconvenience resulting from its use.

I am aware that a revolving caster with a handle projecting up vertically from the center of the base has been used; but the construction of my improved holder enables me to utilize this space at the center, heretofore lost. I do not, therefore, claim a revolving plate or support for holding bottles or boxes; but What I do claim as my invention, and desire to secure by Letters Patent, is—

The fixed central socket $a$ for holding the box $c$, in combination with the revolving plate or support B, having openings for the spice-boxes $l$ $l$, and the base A, all constructed and arranged as set forth.

Witness my hand this 16th day of April, A. D. 1874.

CHARLES E. SEAVEY.

In presence of—
N. W. STEARNS,
W. J. CAMBRIDGE.